Nov. 11, 1969 L. F. MAYLE ET AL 3,478,270

AUTOMATIC PROGRAMMING FOR DETENT-TYPE TV TUNER

Filed Feb. 25, 1966 4 Sheets-Sheet 1

INVENTOR.
LOUIS F. MAYLE and
ROBERT W. SANDERS

BY Woodard, Weikart, Emhardt & Naughton
Attorneys

INVENTOR.
Louis F. Mayle and
Robert W. Sanders
BY Woodard, Weikart, Emhardt & Naughton
Attorneys INVENTORS
LOUIS F. MAYLE and
ROBERT W. SANDERS
BY Woodard, Weikart, Emhardt & Naughton
Attorneys

AUTOMATIC PROGRAMMING FOR DETENT-TYPE TV TUNER

INVENTORS.
LOUIS F. MAYLE and
ROBERT W. SANDERS

BY Woodard, Weikart, Emhardt & Naughton
Attorneys

United States Patent Office 3,478,270
Patented Nov. 11, 1969

3,478,270
AUTOMATIC PROGRAMMING FOR DETENT-TYPE TV TUNER

Louis F. Mayle and Robert W. Sanders, Fort Wayne, Ind., assignors to The Magnavox Company, Fort Wayne, Ind., a corporation of Delaware Filed Feb. 25, 1966, Ser. No. 530,108
Int. Cl. H04b *1/32*
U.S. Cl. 325—470 14 Claims

ABSTRACT OF THE DISCLOSURE

A television tuner of the detented type is provided with a power tuning motor which is operable in response to a manual button or remote control signal. A cam-operated, or detent-operated motor circuit switch keeps the motor energized as the tuner is driven between each detent position and the next. An automatic control circuit is associated with motor hold circuitry to keep the latter closed even at a tuner detent position, unless a suitable station can be tuned. Variations of the control circuit are responsive to: sync signals, (FIGS. 1, 2); AGC current, (FIG. 3); or IF picture carrier current, with means to provide rapid discharge of the I-F AGC voltage filter capacitor to avoid skipping weak stations (FIGS. 4,5) in transition from strong stations, if satisfactory signals can be received at the weak stations.

BACKGROUND OF THE INVENTION

This invention relates generally to search tuning apparatus for radio and television receivers, and more particularly to circuitry for signal sensing and control of such apparatus.

For detent-type television tuners, power tuning with remote control has been on the market for several years. To cause the turret of the tuner to stop at a channel on which a signal may be present, it has been necessary to mechanically program such devices in advance. Various methods have been used for accomplishing this and have employed programming wheels with removable or adjustable pins, screws, and clips, for example. The adjustable program clip arrangement is shown and described in a co-pending application of Max E. Eggman, Ser. No. 199,347, filed June 1, 1962, now Patent No. 3,249,877, issued May 3, 1966.

Although such mechanically pre-programmed remotely-controlled television receivers have been well accepted commercially, it remains desirable to provide receivers which will automatically program themselves in accordance with the stations which happen to be transmitting in any particular area where the receiver is to be used, and at any particular time.

It is therefore a general object of the present invention to provide means enabling television receivers to automatically tune to stations which are transmitting signals.

A further object is to provide means which will prevent the tuner from stopping at a channel location when the station ordinarily tuneable at that location, is off the air.

A further object is to provide means for achieving the foregoing objects easily, with minimal expense, and which are adaptable to incorporation in otherwise conventional television receivers of the pre-programmed, remotely-controlled type.

Described briefly, in a typical embodiment of the present invention, the turret of a detent-type television tuner is directly driven from the output shaft of a remotely controllable tuner drive motor with gear box. Instead of using a "program switch" operable by programming pins or clips of a mechanically pre-programmed receiver, the typical embodiment of the present invention employs a normally closed electrically operable switch which, when opened in response to reception of a television signal, opens the tuner drive circuit to stop the tuner on the station then being received.

The signal sensing circuitry controlling the electrically operable switch employs a relay coil to operate the switch, this coil being in circuit with a rectifier, a resistor, a tuner drive motor holding switch, and the emitter-collector path of a transistor, this combination being connected across a source of alternating current electrical energy. The control circuit of the transistor is coupled to input means receiving a signal generated in the television receiver in response to tuning the receiver to a transmitting station. The coupling is accomplished in several embodiments by tank circuit means tuned to the horizontal synchronizing signal or to the intermediate frequency (IF) picture carrier. In another embodiment the coupling is to the automatic gain control (AGC) circuit of the receiver.

The full nature of the invention will be understood from the accompanying drawings and the following description and claims.

Figure 1:
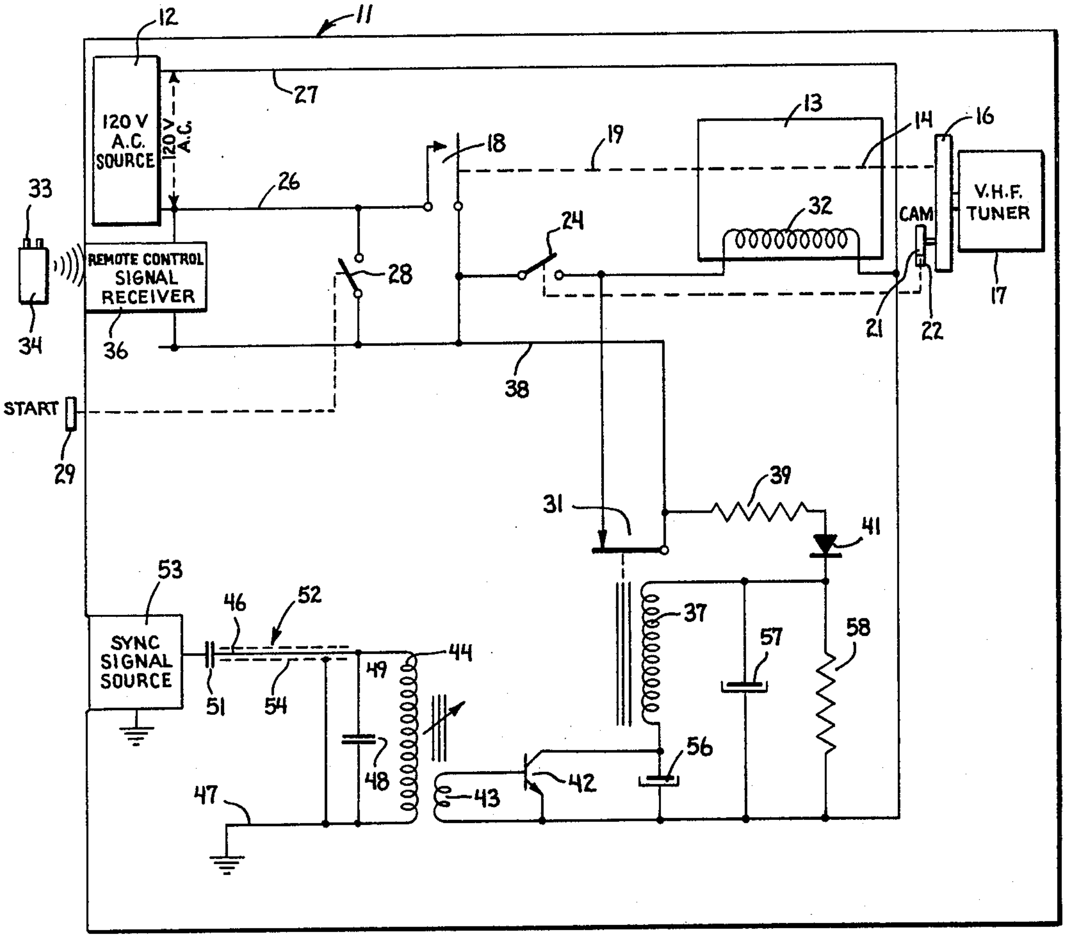
FIGURE 1 is a schematic diagram illustrating a typical embodiment of the present invention responsive to the synchronizing signal for station tuning.

Referring now to the drawings in detail, and to the example shown in FIGURE 1, television receiver 11 has therein a source 12 of 120 volt alternating current electrical energy, which can simply be taken directly from the power line plug. It also has a 120 volt tuner drive motor 13 having an output 14 connected through gear box 16 to drive the V.H.F. tuner 17.

The receiver also includes a normally-open, rotor-operated motor hold switch 18, the movable contactor of which is operated by the motor rotor shaft 19 of the offset rotor motor to close the switch 18 when the motor is energized. Accordingly, energization of the motor serves to close the switch 18, drive the tuner 17 and drive a cam 21 having a follower 22 associated therewith for operation of the "program" switch 24.

The aforementioned components are typically found in power tuned television receivers which are on the market, and are also found in the aforementioned co-pending patent application wherein the program switch also has the identifying reference numeral 24. As described in that patent application, the cam operation of the program switch is such so as to close the program switch by motor operation when a change of channels is initiated, and open the program switch when the cam has made one revolution, the tuner having been driven from one channel position to the next adjacent channel position, centered therein and stabilized by the detent means thereof, all before the cam completes one revolution. In that device, however, there is no rotor-operated motor-hold switch. Instead, program clips or pins and associated means are used to prevent the program switch from opening even after a complete revolution of the cam, if the tuner was then located in a channel position where no reception could be expected. However, where the present invention is incorporated in a receiver of the type in which programming clips or pins have heretofore been used, there is no need for such mechanical programming means and the program switch is arranged to open each time the tuner has moved to one of the detented positions, regardless of whether a signal can be received at that position or not. The electrically operable switch 31 referred to hereinafter determines whether or not the motor will drive the tuner past each or any of the thirteen detented positions typically found in such V.H.F. tuners.

Alternating current power input lines 26 and 27 are provided from the source 12. To energize the motor, the start switch 28 can be closed by the power-tune start button 29 to make a circuit from the power line conductor 26 through switch 28 and through normally-closed motor stopping relay switch 31 and motor winding 32 to the power line 27. As an alternative to manual operation of the power tune button 29 on the front panel of the television receiver, the channel tune button 33 of a remote control transmitter 34 can be actuated to close a start relay switch operated by the remote control signal receiver 36 in the television receiver.

Once the motor is energized, the rotor operated switch 18 is closed by the centering effect of the rotor, so the remote start relay or start switch 28, whichever is used to start the motor, can be a momentary contact type of switch and immediately returns to the normally-open condition. The motor will remain energized until both the electrically operated motor stopping relay switch 31 and the cam operated program switch 24 are opened. As described in the aforementioned application, the program switch 24 will not be opened until after the tuner has arrived at a properly detented station tuning position. The electrically operable switch 31 is opened according to one embodiment of the invention shown in FIGURE 1, by means which will now be described.

A direct current circuit for energizing the motor stopping relay operating coil 37 is provided from conductor 38 through resistor 39, rectifier 41, coil 37, the collector-emitter path of transistor 42 to conductor 27. Control of the transistor 42 is provided by placing a pick-up coil 43 in series with the emitter-base path of the transistor.

The pick-up coil 43 is wound over an inductor 44 having signal input conductors 46 and 47 connected thereto for application of a synchronizing (sync) signal from the television receiver. A capacitor 48 is connected across the inductor 44 providing a tank circuit 49 to which the sync signal is coupled from a high impedance source through capacitor 51 and a shielded audio cable 52. An example of such a source 53 is the sync separator tube on the Magnavox series 45–09 color television chassis. The plate of the sync separator tube is connected to the capacitor 51 and the impedance of this source is approximately 40,000 ohms.

In the illustrated example, the cable shield 54 is shown connected to the conductor 47 and the capacitance of the cable thus becomes part of the capacitance of the tank circuit. It has been found that for a given tank circuit inductor, tuning to the second harmonic of the horizontal sync signal proved to be more effective than tuning to the fundamental. Therefore, by adjustment of the inductance of inductor 44, the tank circuit is tuned to resonate at 31.5 kilocycles.

Operation of the embodiment of FIGURE 1 might be most easily understood if it is assumed that the tuner has been manually turned to a detent position where no television signals are being received. Then, when the start switch is closed or the remote control start relay is closed, the motor will begin to drive the tuner and power is applied to the upper end of the sensing circuitry resistor 39. However, transistor 42 is normally quiescent due to the low-resistance pick-up coil 43 shunting the base and emitter. When the tuner has been driven far enough to cause a sync signal to appear at the plate of the sync separator, the tank circuit 49 resonates at 31.5 kc. and 31.5 kc. pulses of current flow in the pick-up coil due to the rectifying action of the emitter-base junction of the transistor. These pulses drive the transistor into saturation, causing pulses of collector current. To filter out the collector current pulses and hold the collector at the saturation voltage level between pulses, a two $\mu$F electrolytic capacitor 56 is shunted between the collector and the emitter. The collector current energizes the motor stopping relay coil 37, to open switch 31 and stop the motor. Although a smaller capacitor could be used to filter the collector current pulses, the larger capacitor serves the additional purpose of preventing the flow of current in the relay coil from suddenly being interrupted, which would cause a kick-back pulse of voltage which might damage the transistor. Such interruption could otherwise occur when the motor stopping switch 31 is opened causing the motor to stop and the motor holding switch 18 to thereupon open, interrupting the supply to conductor 38. If desired, a smaller capacitor could be used at 56, and a diode employed across the coil 37.

So it is seen that when the motor has driven the tuner to a position where a station is tuned and the sync signal appears at the inputs to the sensing circuitry, the tuning motor is stopped and the receiver will remain tuned to that station until a person desires to change stations.

In order to prevent the sync signal derived from a station to which the receiver is tuned, from causing immediate opening of the motor stopping relay when the start switch 28 is next closed, a time delay in voltage rise in the sensing circuitry is provided. This is accomplished by the combination of the series resistor 39 and the shunt combination of filter capacitor 57 and resistor 58. The delay provides time for the cam 21 to close the program switch 24 after motor operation is initiated by the start relay or switch so that, if a signal is being received at the station, the motor will not immediately be stopped and will be able to drive the tuner off the station before coil 37 can be sufficiently energized to open the motor stopping switch 31. The motor will continue to drive the tuner until it arrives at the next station which is strong enough to provide a sync signal at the source 53. Then the motor stopping relay will be energized, the switch 31 thereof will open, and as soon as the cam 21 opens the program switch 24 or, if the program switch has already been opened, the motor will be deenergized. Deenergization of the motor causes the rotor to become offset again whereupon the motor holding switch 18 is opened and the current supply to the sensing circuitry is terminated. When the direct current voltage across the filter capacitor of the power supply decays below the drop-out voltage of the relay, the normally-closed contacts of the relay switch 31 will again close and the circuit will be ready to re-cycle.

If the start switch button 29 is not released by the time the motor stopping relay actuates, the motor will stop anyhow and the motor holding switch will open. However, the sensing circuit power supply will remain activated through the closed start switch 28 until the button 29 is released. Accordingly, so long as a signal is being received, the motor stopping relay will remain actuated, keeping the motor circuit open. When the start switch is finally released, the A-C supply to the power supply will be interrupted, and after the D-C voltage across the filter capacitor 57 decays below the drop-out voltage of the relay, the normally-closed relay switch 31 will close and the circuit will be ready to re-cycle. Thus, the turret of the V.H.F. tuner will stop at the next channel on which a TV signal is present, regardless of the position of the start switch. This is a considerable advantage because otherwise it would be possible that due to the speed of operation of the tuner drive, an adjacent channel on which a signal is present might be passed before the start switch button was released.

Figure 2:
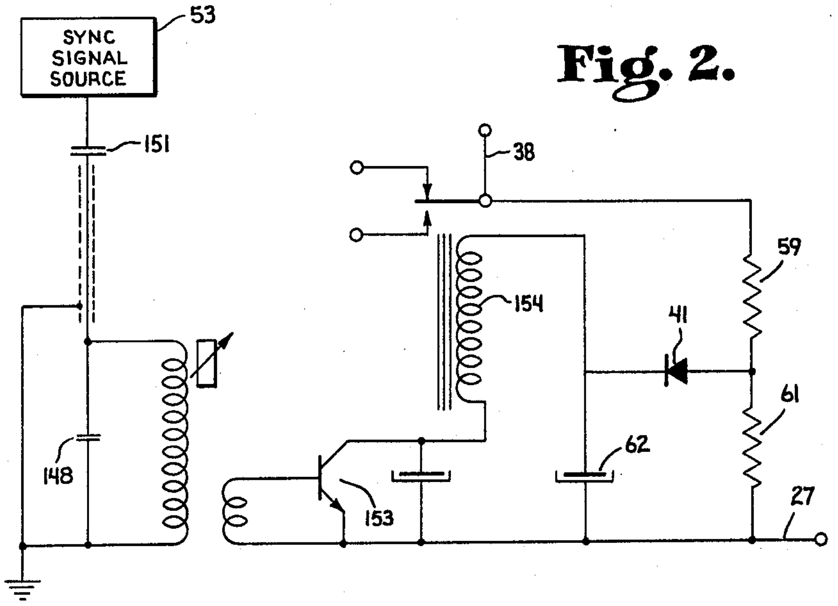
FIGURE 2 is a schematic diagram of an embodiment similar to that of FIGURE 1, but illustrating a modified power supply therefor.

Referring now to FIGURE 2, the sensing circuit is similar to that of FIGURE 1, differing therefrom primarily in the power supply. In FIGURE 2, the rectifier diode 41 connects between a resistive voltage divider comprising resistors 59 and 61 and which are connected across the A-C line between conductors 27 and 38 of FIGURE 1, for example. In this instance, a filter capacitor 62 is connected to the cathode of the diode, as was the filter capacitor 57 in FIGURE 1. By so connecting the rectifier diode in FIGURE 2, it is subjected to a substantially lower peak inverse voltage than the rectifier diode in the circuit of FIGURE 1 wherein the peak inverse voltage is equal to the D-C voltage plus peak line voltage. In FIGURE 2, it is equal to the D-C voltage plus the peak line voltage as divided by the voltage divider. In this circuit also, as will be demonstrated by the list of exemplary component values given hereinafter, the tank circuit is of lower impedence for coupling to a low impedence sync circuit (800 to 4000 ohms) as used in Magnavox black-and-white TV receivers, for example. In this example, the coupling capacitor value is 82 picofarads (pf.). A larger tank circuit capacity is used (560 pf. plus the shielded cable capacity) but the same tank coil may be used, adjusted to a lower inductance.

Figure 3:
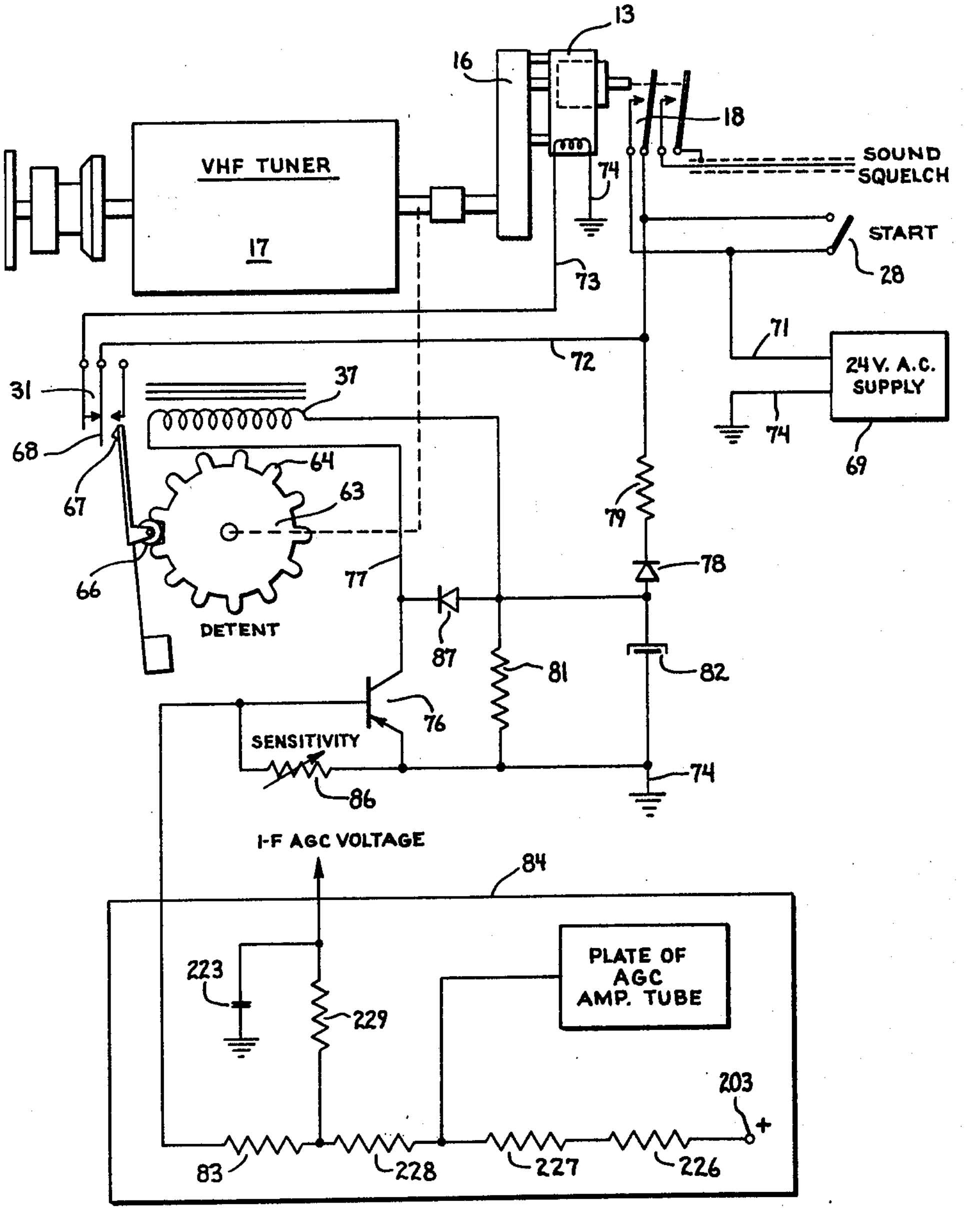
FIGURE 3 is a schematic diagram of an embodiment responsive to current in the AGC circuitry of the receiver, for station tuning, and also incorporating detent operating means in combination with the electrically operable switch for motor control.

Sensing circuitry according to another embodiment of our invention is shown in FIGURE 3, wherein components corresponding to those in FIGURES 1 and 2 are given the same reference numerals, although in practice the ratings of such components as to voltage, resistance, and power, for example, may be different.

In the embodiment of FIGURE 3, instead of incorporating a cam and program switch of the type used in the aforementioned Eggman patent application, a detent wheel 63 having a plurality of detent lugs 64 therein and connected to the tuner 17 to be driven therewith, is employed. A follower 66 is employed therewith and has a portion 67 engageable with the movable contactor 68 of the relay operated switch 31 for control thereof in a manner fully described in a co-pending application of Louis F. Mayle, Ser. No. 520,407, filed Jan. 13, 1966, and entitled Search Tuning Apparatus for Continuous and Detent-Type Tuners. In brief, the functions of the detent wheel and spring loaded follower and switch control portion of the follower are to properly detent the tuner at each of thirteen potential station tuning positions and effect closure of the electrically operable switch 31 at any time other than when the tuner is properly detented, and to do so in spite of whether or not the operating coil 37 is energized.

In the embodiment of FIGURE 3, a twenty-four volt alternating current supply is provided at 69, and when the start switch 28 is closed, the tuner drive motor is energized by a circuit from the supply 69 through conductor 71, through the start switch, through conductor 72, through the normally-closed electrically operable motor stopping switch 31, through conductor 73 and through the motor winding 32 and ground 74 back to the supply 69. In this embodiment, the current path for energizing the motor stopping relay coil can be traced from ground 74 through the emitter-collector path of transistor 76 and through conductor 77 and the operating coil 37 and through rectifier 78 and the low value resistor 79 and through the motor holding switch 18 and conductor 71 to the power supply. As an example, resistor 79 may have a value of 180 ohms, whereas resistor 81 may have a value of 10,000 ohms and capacitor 82 may have a value of 150 $\mu$fd., coil 37 being a 4,000 ohm coil.

In this embodiment of the invention, detection of the magnitude of the current flowing in the resistor across which the AGC voltage of the television receiver is developed, is the means used for signal sensing. For this purpose, the base-emitter junction of the PNP transistor 76 is connected in series with the ground end of the resistor 83 in the AGC circuit 84 of the receiver, this being the resistor across which the AGC voltage is developed. A silicon transistor is preferred for this purpose, because of its higher off-set voltage, and a rheostat 86 is shunted across the base-emitter junction to insure that the transistor is cut off when no current is flowing in the resistor 83 in series with the base. The rheostat also serves as a sensitivity control.

In the embodiment of FIGURE 3, a diode 87 is shunted across the relay coil 37 to protect the transistor from any damaging kick-back voltage which might otherwise be developed across the coil from sudden interruption of the base current. Instead of the diode, an electrolytic capacitor of 50 $\mu$fd. at three volts may be shunted between the emitter and base of the transistor, preventing a sudden change of base current. The capacitor may be desirable in keeping A-C components out of the transistor circuit.

In summary, therefore, the arrangement of FIGURE 3 is useful in television receivers wherein the resistor across which the AGC voltage is developed, is returned to ground, and the signal sensing circuitry inserts the emitter-base path of transistor 76 in the ground return of the AGC circuit resistor.

Figure 4:
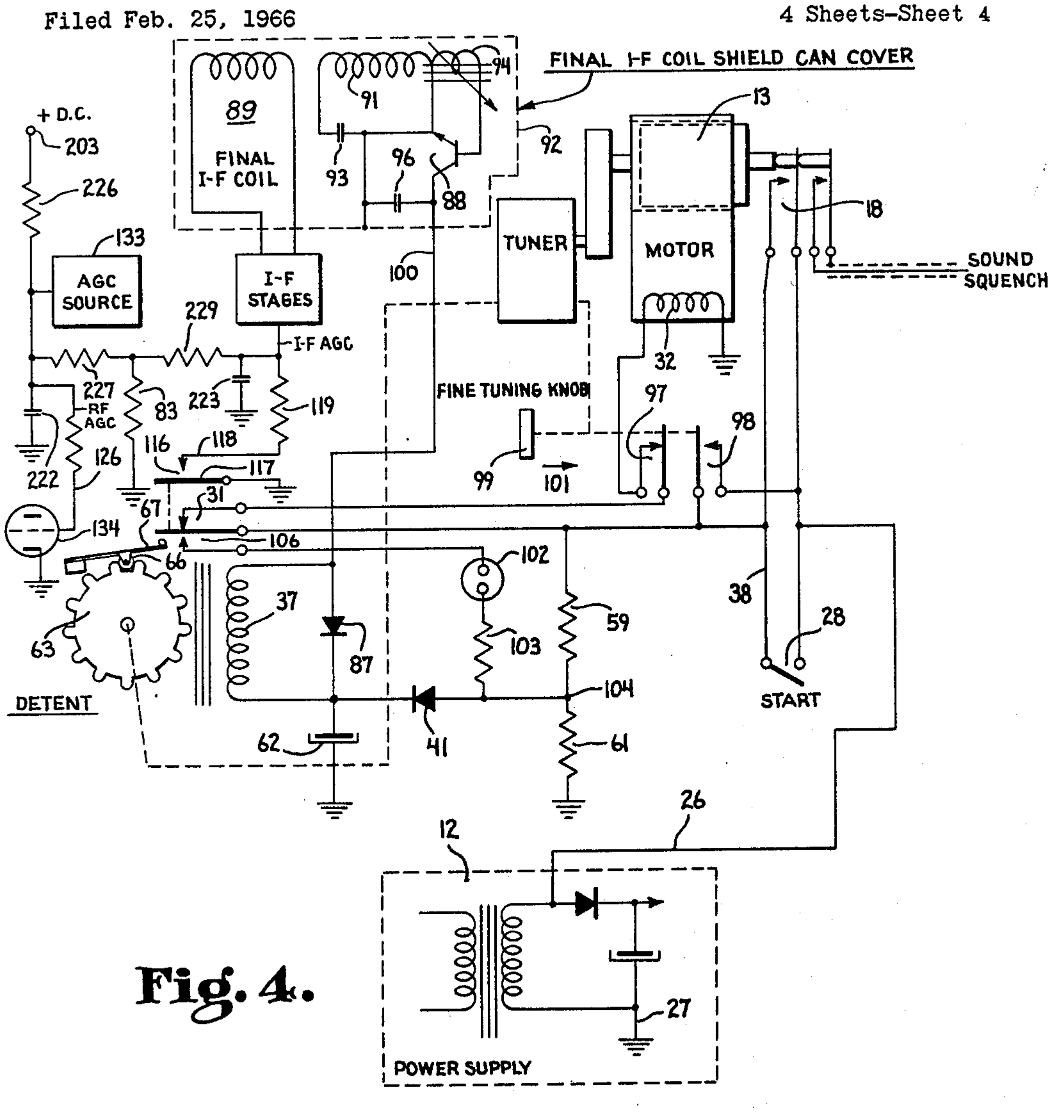
FIGURE 4 is a schematic diagram of an embodiment responsive to the IF picture carrier for station tuning in a VHF receiver, and employing a fine tuning indicator arrangement, and employing means to avoid skipping a weak station when driving the tuner from a strong station.

Referring now to FIGURE 4, a 120 volt motor 13 may be employed as in FIGURE 1, and the power supply 12 therefor may be derived from the half-wave power supply of a television receiver such as is employed in the Magnavox series 40 and 50 television chassis. In these receivers, one side of the power transformer secondary is connected to chassis ground and so conductor 27 is shown grounded in FIGURE 4. A similarity to the circuit of FIGURE 2 exists in that the rectifier diode 41 connects between the operating coil 37 and a resistive voltage divider consisting of resistors 59 and 61. In FIGURE 4 also, the detent wheel 63 and follower is arranged as in FIGURE 3 to close the motor stopping switch 31 independently of the control coil 37.

In this embodiment of FIGURE 4, a transistor 88 is employed in the circuit by which coil 37 is energized. This transistor is employed with a tank circuit tuned to the I-F picture carrier of the television receiver. In this embodiment, the final I-F coil 89 of the television receiver is loosely coupled to a tank coil 91 placed inside the final I-F coil shield can cover 92, which is grounded. The tank coil is in tank circuit relationship with capacitor 93 and a single turn pick-up coil 94 connects between the base and emitter of the high frequency transistor 88, which may be either PNP or NPN, the latter being used in this example. The collector of the transistor connects to one terminal of the motor stopping relay coil 37 and the emitter is connected to the grounded can cover.

Operation of the circuit of FIGURE 4 is similar to that of the circuit of FIGURE 1 except that instead of 31.5 kc. pulses driving the transistor into saturation, pulses at the I-F picture carrier frequency (45.75 mc.) drive the transistor into saturation. The 1500 pf. capacitor 96 shunting the collector and emitter holds the collector voltage at the saturation level between the 45.75 mc. pulses. The diode 87 is used across the relay coil to absorb possible kick-back voltage pulses which might otherwise damage the transistor. A 2 $\mu$fd. electrolytic capacitor located at the relay may be used in lieu of the diode if it is cheaper.

With I-F picture carrier signal sensing, the added feature of a fine tuning indicator may be easily provided. For this purpose, a normally-closed switch 97 and a normally-open switch 98 are provided with movable contactors connected to the fine tuning knob 99 of the television receiver. The normally-closed switch is in series with the motor winding 32 and the normally-open pair is in parallel with the start switch 28. When the fine tuning knob is depressed in the direction of the arrow 101 to accomplish fine tuning of the tuner, the normally-closed contacts disconnect the motor winding from the circuit while the normally-open contacts, which are thereby closed, energize the signal sensing circuit D-C voltage supply. As the fine tuning knob is rotated for fine tuning the receiver, the motor stopping relay will actuate when the I-F picture carrier is at the resonant frequency of the tank circuit 91–93 (45.75 mc.). A neon lamp 102 with an appropriate series resistor 103 is connected between the junction 104 and the normally-open contacts 106 associated with the motor stopping relay. Accordingly, when the relay is energized in response to manual fine tuning of the receiver to obtain the 45.75 mc. I-F picture carrier, the neon lamp will be lighted and indicate a correct fine tuning adjustment.

The neon lamp load can also serve another purpose in that, when the motor stopping relay actuates, the load applied by the relay drops the D-C voltage of the sensing circuit supply. With the neon lamp load shunting resistor 59, the D-C voltage will be restored. Thus, a higher resistance voltage divider can be used, permitting a one-half watt resistor to be used at 59. Otherwise a resistor of a higher power rating would be required.

Figure 5:
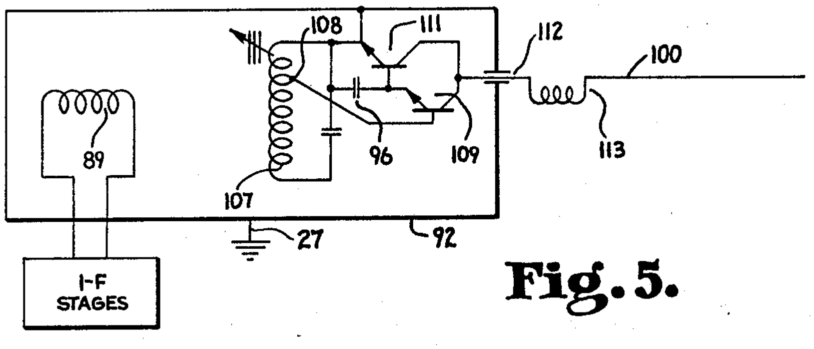
FIGURE 5 is a schematic diagram of a coupling arrangement for IF picture carrier sensing means useful as an alternative to that shown in FIGURE 4.

In order to make the circuit of FIGURE 4 work properly with looser coupling of the tank circuit to the final I-F coil, the arrangement shown in FIGURE 5 can be employed. In this embodiment, the tank coil 107 is placed along a bottom edge of the I-F shield can cover 92 so as to be at right angles to the final I-F coil 89, thus minimizing coupling. If the total tank coil turns are 8½ the tap 108 is at three turns from one end of the coil. This tap is connected to the base of the first transistor 109 of two transistors 109 and 111 in a Darlington connection. The 1500 pf. capacitor 96 is connected across the base-emitter path of transistor 111 so that transistor 111 need be responsive only to direct current. Therefore, transistor 111 can be a less expensive audio type device than might otherwise be required in the Darlington pair. A 1000 pf. feed-through capacitor 112 is used to bring the collector lead of transistor 111 through the can cover and by-pass the R-F component to ground. An R-F choke 113 can be inserted in series in the direct current lead 100 to the motor stopping relay coil to prevent regeneration through the antenna terminals in the event the motor stopping relay is mounted so close to the tuner as to otherwise result in regeneration.

The arrangement of FIGURE 5 avoids any observable deleterious effect on the picture and yet the circuit is extremely sensitive. In fact it is possible to obtain saturation of transistor 111 and consequent operation of the motor stopping relay even with a signal so weak that the raster is no longer synchronized.

With I-F picture carrier signal sensing for automatic programming on V.H.F., a situation can occur in which it is possible for the tuner to drive past a station producing a weak signal, following the tuning of a station producing a strong signal. This can occur if the speed of transition between adjacent channels is so high and the AGC circuit time constant is so great that the two are incompatible for tuning a weak station following a strong station. This is because a strong TV signal develops a high AGC voltage which reduces the gain of both the R-F and I-F amplifiers. When a weak TV signal is received, very little AGC voltage is developed and the amplifiers operate at maximum gain. When a rapid transition is made from a strong to a weak station, the output signal of the I-F amplifier at first is extremely weak because the high AGC voltage due to the strong station has not had sufficient time to dissipate. Thus the tuner turret can be driven past the adjacent channel receiving the weak signal, before the amplifier gain is restored.

To avoid the aforementioned problem, one arrangement is shown in FIGURE 4 wherein a normally-open switch 116 has the movable contactor 117 thereof arranged to be closed with the fixed contactor 118 thereof when the detent wheel 63 has moved the detent 66 near the maximum deflection point from its normal, between-lugs, fully-detenting position. The fixed contactor 118 is connected through resistor 119 (of the order of 20,000 ohms) to the I-F AGC filter capacitor 223. As the turret rotates, the operation of the detent follower closes the switch 116 and grounds the AGC filter capacitor through resistor 119 to restore the I-F AGC voltage at 122 to zero as the tuner moves between adjacent channel positions.

Figure 6:
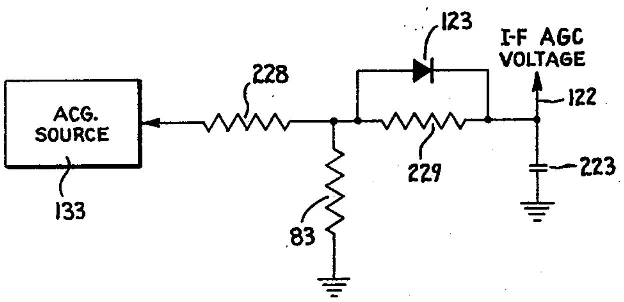
FIGURE 6 is a schematic diagram of another means to avoid skipping a channel where there is a significant difference in signal strength of adjacent channels.

Another method of achieving the foregoing result is illustrated in FIGURE 6 wherein a diode 123 is connected across resistor 229 of the I-F AGC voltage filter. The diode is oriented so that it is non-conducting while the magnitude of the AGC voltage at 122 increases, and the diode is conducting when the magnitude decreases. Thus, when the source 133 of AGC voltage (the plate of an AGC amplifier tube, for example) goes to zero, the filter capacitor 223 will rapidly discharge through the diode and the relatively low impedance of resistor 83. So it is that when the receiver tunes off one station, resulting in return of the AGC voltage source to zero, the AGC voltage itself promptly returns to zero permitting the gain of the I-F amplifier to increase again so that a weak station can activate the signal sensing circuitry.

In FIGURES 4 and 6, two different arrangements have been shown for providing rapid discharge of the I-F AGC voltage filter capacitor, as the turner is driven between channels. Neither arrangement is necessary for the R-F AGC filter capacitor in the arrangement of FIGURE 4 wherein the R-F AGC voltage is developed at 126. The resistive component of the R-F AGC voltage filter is a resistive voltage divider 227, 226 between the AGC voltage source 133 and a 135 volt positive D-C source at 203. In this example, when the AGC source voltage at 133 goes to zero, the negative voltage on the capacitor at 222 starts rising and is typically clamped to zero by the grid to cathode diode of the R-F amplifier tube 134, to the grid of which the R-F AGC voltage is connected. Therefore, although the time constant for the R-F AGC filter may be larger than the time constant for the I-F AGC filter, the R-F AGC filter capacitor 222 can discharge to ground potential much faster than the capacitor of the I-F AGC filter could, prior to incorporation of the rapid discharge arrangements described hereinabove.

Figure 7:
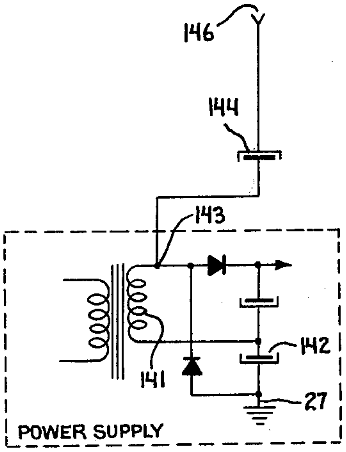
FIGURE 7 is a schematic diagram of a voltage doubler power supply which can be employed with the embodiment of FIGURE 4 as an alternative to the half-wave power supply shown in FIGURE 4.

FIGURE 7 shows a voltage doubler power supply such as is incorporated in the Magnavox series 45 color television chassis, and which can be employed with the embodiment of the present invention which is shown in FIGURE 4. In this power supply, the transformer secondary winding 141 is not connected to chassis ground 27, but the lower end of the winding is near A-C chassis ground potential through the 160 $\mu$f. capacitor 142 which connects between the lower end of the winding and the chassis ground. The tuner drive motor 13 (FIGURE 4) and the sensing circuit are supplied at 146 from the upper end of the winding 141 through an electrolytic capacitor 144 of appropriate size to serve two functions: (1) a voltage dropping impedance since the transformer secondary winding voltage is in the order of 150 volts whereas the motor is a nominal 120 volt motor, and (2) a blocking capacitor, since in a voltage doubler circuit the transformer secondary is at a D-C potential of half the output voltage. The capacitor 142 can serve only to a very limited extent as a voltage dropping impedance because of the low 60 cycle frequency. Thus the output of the circuit of FIGURE 7 is available at the terminal 146 for connection to the conductor 26 of FIGURE 4 instead of the half-wave power supply shown in FIGURE 4.

For purposes of example only, the values and description of some of the components shown in various figures of the drawings are presented below.

FIGURE 1

Capacitor 51, 18 pf.
Capacitor 48, 390 mf.
Take-off coil 43, 90 turns
Transistor 42, NPN SE-4001 (Fairchild)
Capacitor 56, 2 μf.
Relay coil 37, 3500 ohms
Capacitor 57, 10 μf.
Resistor 58, 5600 ohms
Resistor 39, 8200 ohms
Diode 41, 530072-4 or 530072-9 (Magnavox)

FIGURE 2

Capacitor 151, 82 pf.
Capacitor 148, 560 pf.
Transistor 153, 41N2 (Magnavox)
Capacitor 62, 20 μf.
Resistor 59, 5000 ohms
Resistor 61, 1000 ohms
Coil 154, 4000 ohms

FIGURE 3

Resistor 81, 10,000 ohms
Capacitor 82, 150 μf.
Resistor 79, 180 ohms
Supply 69, 24 volts A.C.
Resistor 83, 68,000 ohms
Resistor 229, 470,000 ohms
Resistor 228, 330,000 ohms
Resistor 227, 820,000 ohms
Resistor 226, 3.6 megohms
Capacitors 222 and 223, .22 μf.

FIGURE 4

Transistor 88, 42N2 (Magnavox)
Capacitor 96, 1500 pf.
Capacitor 93, 22 pf.

FIGURE 6

Same as FIGURES 3 and 4.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. Circuitry for the automatic programming of a television receiver, said circuitry comprising:

first input means for connection to a source of alternating current electrical energy;

a first transistor having control circuit means and load circuit means;

a switch operator, a first rectifier, first resistance means, and the load circuit means of said first transistor, connected in series circuit relation across said first input means;

second input means receiving a signal produced in a television receiver in response to the tuning of the receiver to and reception thereby of signals produced by a television transmitter;

means coupling said second input means with said transistor control circuit means to respond to said produced signal to thereby effect in said transistor control circuit means current sufficient to cause current in said transistor load circuit means to sufficiently energize said switch operator to operate switch operator means for deactivating tuner drive means;

said means coupling said second input means with said transistor control circuit means including transformer means having primary circuit means coupled to said second input means and a secondary circuit means in circuit with said transistor control circuit means;

said circuitry further comprising a first tank circuit including first capacitance means and said primary circuit means connected in tank circuit relationship, said first tank circuit being tuned to resonate in response to said produced signals when they are of a predetermined frequency to thereupon induce in said secondary circuit means and thereby in said transistor control circuit means current pulses sufficient to cause the current in said transistor load circuit means to sufficiently energize said switch operator to operate switching means for de-activating tuner drive means;

said circuitry including additional resistance and capacitance means coupled to said first input means and cooperable with said first resistor to delay build-up of voltage applied to said operating coil upon closure of said series circuit therethrough;

said first resistance means and said additional resistance means forming a voltage divider, with said rectifier being connected at one point to a junction of said first resistance means and said additional resistance means and at another point to said operating coil.

2. Circuitry for the automatic programming of a television receiver, said circuitry comprising:

first input means for connection to a source of alternating current electrical energy;

a first transistor having control circuit means and load circuit means;

a switch operator, a first rectifier, first resistance means, and the load circuit means of said first transistor, connected in series circuit relation across said first input means;

second input means receiving a signal produced in a television receiver in response to the tuning of the receiver to and reception thereby of signals produced by a television transmitter;

means coupling said second input means with said transistor control circuit means to respond to said produced signal to thereby effect in said transistor control circuit means current sufficient to cause current in said transistor load circuit means to sufficiently energize said switch operator to operate switching means for de-activating tuner drive means;

said means coupling said second input means with said transistor control circuit means including transformer means having primary circuit means coupled to said second input means and a secondary circuit means in circuit with said transistor control circuit means;

said circuitry further comprising a first tank circuit including first capacitance means and said primary circuit means connected in tank circuit relationship, said first tank circuit being tuned to resonate in reponse to said produced signals when they are of a predetermined frequency to thereupon induce in said secondary circuit means and thereby in said transistor control circuit means current pulses sufficient to cause the current in said transistor load circuit means to sufficiently energize said switch operator to operate switching means for de-activating tuner drive means;

said second input means including video I-F circuit means in a television receiver;

said video I-F circuit means including an I-F coil and a coil shielding enclosure, said transformer means being located inside said shielding enclosure and loosely coupled to said I-F coil.

3. The circuitry of claim 2 wherein:

said transistor control circuit means includes a second transistor having a control circuit and a load circuit, said tank circuit being connected to the load circuit of said second transistor, said transistors being arranged in a Darlington connection.

4. Circuitry for the automatic programming of a television receiver, said circuitry comprising:

first input means for connection to a source of alternating current electrical energy;

a first transistor having control circuit means and load circuit means;

a switch operator, a first rectifier, first resistance means, and the load circuit means of said first transistor, connected in series circuit relation across said first input means;

second input means receiving a signal produced in a television receiver in response to the tuning of the receiver to and reception thereby of signals produced by a television transmitter;

means coupling said second input means with said transistor control circuit means to respond to said produced signal to thereby effect in said transistor control circuit means current sufficient to cause current in said transistor load circuit means to sufficiently energize said switch operator to operator switching means for de-activating tuner drive means;

said means coupling said second input means with said transistor control circuit means including transformer means having primary circuit means coupled to said second input means and a secondary circuit means in circuit with said transistor control circuit means;

said circuitry further comprising a first tank circuit including first capacitance means and said primary circuit means connected in tank circuit relationship, said first tank circuit being tuned to resonate in response to said produced signals when they are of a predetermined frequency to thereupon induce in said secondary circuit means and thereby in said transistor control circuit means current pulses sufficient to cause the current in said transistor load circuit means to sufficiently energize said switch operator to operate switching means for de-activating tuner drive means;

said second input means including video I-F circuit means in a television receiver;

and AGC means coupled to said I-F circuit means, said AGC means including charge storage means holding an AGC voltage thereon produced in response to reception of signals from one television station;

and discharge means coupled to said storage means and arranged for rapid discharge of said storage means when the tuning of the receiver to said one station is terminated to promptly reduce AGC voltage and avoid passing a weak station during tuner drive from a strong station.

5. The circuitry of claim 4 wherein:

said AGC means includes an AGC voltage source, and said discharge means includes a diode coupled between said storage means and said AGC voltage source and oriented to oppose flow of positive current therethrough from said storage means to said source, and said discharge means includes impedance means coupled to said storage means and to said diode and completing a discharge circuit from said storage means through said impedance means and through said diode to said storage means.

6. The circuitry of claim 4 wherein:

said AGC means includes an AGC voltage source, and said discharge means includes a normally-open discharge switch operable by said tuner drive means upon tuner drive from a station, and said discharge means includes impedance means coupled to said storage means and to said switch and completing a discharge circuit from said storage means through said impedance means and through said discharge switch, when closed, back to said storage means.

7. Circuitry for the automatic programming of a television receiver, said circuitry comprising:

first input means for connection to a source of alternating current electrical energy;

a first transistor having control circuit means and load circuit means;

a switch operator, a first rectifier, first resistance means, and the load circuit means of said first transistor, connected in series circuit relation across said first input means;

second input means receiving a signal produced in a television receiver in response to the tuning of the receiver to and reception thereby of signals produced by a television transmitter;

means coupling said second input means with said transistor control circuit means to respond to said produced signal to thereby effect in said transistor control circuit means current sufficient to cause current in said transistor load circuit means to sufficiently energize said switch operator to operate switching means for de-activating tuner drive means;

a tuner having cam means and a cam and tuner drive motor associated therewith, said tuner having a plurality of discrete potential station tuning positions, a normally-closed program switch associated with said cam means and located in a tuner drive motor holding circuit, said program switch being opened by said cam means each time said motor has driven said tuner from one of said positions to the next adjacent one of said positions to enable timely termination of tuner drive by said switching means in response to tuning of a station, but said program switch remaining closed when said tuner is between adjacent one of said positions to avoid termination of tuner drive until arrival at one of said positions.

8. Circuitry for the automatic programming of a television receiver, said circuitry comprising:

first input means for connection to a source of alternating current electrical energy;

a first transistor having control circuit means and load circuit means;

a switch operator, a first rectifier, first resistance means, and the load circuit means of said first transistor, connected in series circuit relation across said first input means;

second input means receiving a signal produced in a television receiver in response to the tuning of the receiver to and reception thereby of signals produced by a television transmitter;

means coupling said second input means with said transistor control circuit means to respond to said produced signal to thereby effect in said transistor control circuit means current sufficient to cause current in said transistor load circuit means to sufficiently energize said switch operator to operate switching means for de-activating tuner drive means;

a tuner having detent means connected thereto for stabilizing the tuner in each of a plurality of station tuning positions, switch controlling means associated with said switching means and operable by said detent means to prevent said switching means from prematurely de-activating tuner drive means, whereby proper tuner location in each station tuning position is assured.

9. Circuitry for the automatic programming of a television receiver, said circuitry comprising:

first input means for connection to a source of alternating current electrical energy;

a first transistor having control circuit means and load circuit means;

a switch operator, a first rectifier, first resistance means, and the load circuit means of said first transistor, connected in series circuit relation across said first input means;

second input means receiving a signal produced in a television receiver in response to the tuning of the receiver to and reception thereby of signals produced by a television transmitter;

means coupling said second input means with said transistor control circuit means to respond to said produced signal to thereby effect in said transistor control circuit means current sufficient to cause current in said transistor load circuit means to sufficiently enrgize said switch operator to operate switching means for de-activating tuner drive means;

AGC means, said AGC means including an AGC voltage source and resistance means across which an AGC voltage is developed, said second input means including said resistance means, and said coupling means including said resistance means in said transistor control circuit means.

10. The control circuitry of claim 9 and further comprising:

impedance means connected to the said transistor control circuit means, said impedance means being adjustable to keep said transistor cut-off until current flow in said resistance means increases to a desired value.

11. In automatic programming circuitry for a television receiver, the combination comprising:

a tuner having detent means for detenting said tuner in each of a plurality of discrete potential station tuning positions;

tuner drive means connected to said tuner and operable, when energized, to drive said tuner from each of said positions to the next adjacent one of said positions, and to continue driving said tuner through said positions in sequence until de-energized;

a source producing intermediate frequency signals of frequency which varies as said tuner tunes through a station;

a control circuit coupled to said source and responsive to production of intermediate frequency signals at a predetermined frequency when said tuner is driven to a position tuning a station, to thereupon de-energize said drive means and enable said tuner to remain in the one of said positions tuning that station;

AGC means coupled to said intermediate frequency signal source, said AGC means including charge storage means holding an AGC voltage thereon produced in response to reception of signals from said station;

and discharge means coupled to said storage means and arranged for rapid discharge of said storage means when said tuner is tuned off said station, to promptly reduce AGC voltage and avoid passing a weak station during drive of said tuner away from said station.

12. The combination of claim 11 wherein:

said AGC means includes an AGC voltage source, and said discharge means includes a diode coupled between said storage means and said AGC voltage source and oriented to oppose flow of positive current therethrough from said storage means to said source, and said discharge means includes impedance means coupled to said storage means and to said diode and completing a discharge circuit from said storage means through said impedance means and through said diode to said storage means.

13. The combination of claim 11 wherein:

said AGC means includes an AGC voltage source, and said discharge means includes a normally-open discharge switch operable by said tuner drive means upon tuner drive from a station, and said discharge means includes impedance means coupled to said storage means and to said switch and completing a discharge circuit from said storage means through said impedance means and through said discharge switch, when closed, back to said storage means.

14. In automatic programming circuitry for a television receiver, the combination comprising:

a tuner having detent means for detenting said tuner in each of a plurality of discrete potential station tuning positions;

tuner drive means connected to said tuner and operable, when energized, to drive said tuner from each of said positions to the next adjacent one of said positions, and to continue driving said tuner through said positions in sequence until de-energized;

AGC means, said AGC means including an AGC voltage source and resistance means across which an AGC voltage is developed;

and a control circuit coupled to said resistance means and responsive to production of current in said resistance means by said AGC voltage source in response to the tuning of a station, to thereupon de-energize said drive means and enable said tuner to remain in the one of said positions tuning that station.

References Cited

UNITED STATES PATENTS 3,388,215 6/1968 Mayle ---------------- 178—5.8

KATHLEEN H. CLAFFY, Primary Examiner

BARRY PAUL SMITH, Assistant Examiner

U.S. Cl. X.R.

178—5.8; 325—471